US010929263B2

(12) United States Patent
Paveza et al.

(10) Patent No.: US 10,929,263 B2
(45) Date of Patent: Feb. 23, 2021

(54) IDENTIFYING A DELAY ASSOCIATED WITH AN INPUT/OUTPUT INTERRUPT (71) Applicant: International Business Machines Corporation, Armonk, NY (US)

(72) Inventors: John Richard Paveza, Morgan Hill, CA (US); Harry M Yudenfriend, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 83 days.

(21) Appl. No.: 16/188,756

(22) Filed: Nov. 13, 2018

(65) Prior Publication Data
US 2020/0151002 A1 May 14, 2020

(51) Int. Cl.
*G06F 11/34* (2006.01)
*G06F 13/24* (2006.01)
*G06F 9/48* (2006.01)
*G06F 11/07* (2006.01)

(52) U.S. Cl.
CPC ...... *G06F 11/3485* (2013.01); *G06F 11/3419* (2013.01); *G06F 13/24* (2013.01); *G06F 9/4825* (2013.01); *G06F 11/0757* (2013.01)

(58) Field of Classification Search
CPC ............. G06F 9/45558; G06F 11/3419; G06F 11/3485
See application file for complete search history.

(56) References Cited

U.S. PATENT DOCUMENTS

| 5,388,254 | A | 2/1995 | Betz et al. |
| 5,894,583 | A | 4/1999 | Johnson et al. |
| 6,219,727 | B1 | 4/2001 | Kailash et al. |
| 6,792,483 | B2 | 9/2004 | Schmidt |
| 7,321,945 | B2 | 1/2008 | Kataoka |
| 8,751,757 | B1 * | 6/2014 | Gaikwad ............. G06F 11/3485 711/156 |
| 2007/0208849 | A1 * | 9/2007 | Ely ..................... G06F 11/3495 709/224 |
| 2013/0080673 | A1 | 3/2013 | Feehrer et al. |

(Continued)

FOREIGN PATENT DOCUMENTS

JP     2004165886 A     6/2004

*Primary Examiner* — Albert Wang
(74) *Attorney, Agent, or Firm* — Cantor Colburn LLP; Teddi Maranzano (57) ABSTRACT In one example implementation according to an embodiment described herein, a computer-implemented method includes detecting input/output (I/O) interrupts for executing I/O operations occurring over a period of time. The method further includes calculating an I/O interrupt delay time (IIDT) for each I/O interrupt occurring during the period of time. The method further includes binning the IIDT for each I/O interrupt occurring during the period of time into one of a plurality of bins based on a value of the IIDT, each of the plurality of bins storing a count of IIDT values within a defined range. The method further includes determining a highest IIDT value. The method further includes identifying a performance degradation based at least on one of the count of IIDT values of each of the plurality of bins or the highest IIDT value. The method further includes implementing a corrective action to mitigate the performance degradation.

20 Claims, 8 Drawing Sheets (56) References Cited

U.S. PATENT DOCUMENTS

| | | |
|---|---|---|
| 2013/0297832 A1 | 11/2013 | Ahmad et al. |
| 2013/0339951 A1* | 12/2013 | Gassert .............. G06F 11/3485 |
| | | 718/1 |
| 2016/0011997 A1 | 1/2016 | Liu et al. |

* cited by examiner

| Device ID | Bin 1 | Bin 2 | Bin 3 | Bin 4 | Bin 5 | Bin 6 | Max IIDT | Int Dly Max date and time | Avg IIDT |
|---|---|---|---|---|---|---|---|---|---|
| D01 | 8 | 1 | 0 | 0 | 0 | 0 | 52 | 07/30/2018 16:20:10.488586 | 10 |
| D02 | 16 | 20 | 0 | 0 | 0 | 0 | 39 | 07/30/2018 16:20:14.161476 | 14 |
| D03 | 5 | 3 | 0 | 0 | 0 | 0 | 58 | 07/30/2018 16:26:2.498028 | 15 |
| D04 | 147 | 123 | 2 | 1 | 1 | 0 | 19630 | 07/30/2018 16:1:57.176227 | 118 |
| D05 | 0 | 6 | 0 | 0 | 0 | 0 | 26 | 07/30/2018 16:6:36.959731 | 21 |
| D06 | 3 | 1 | 0 | 0 | 0 | 0 | 13 | 07/30/2018 16:12:19.295132 | 6 |
| D07 | 480 | 1142 | 264 | 1 | 0 | 0 | 1540 | 07/30/2018 16:28:59.813639 | 49 |

FIG. 8

IDENTIFYING A DELAY ASSOCIATED WITH AN INPUT/OUTPUT INTERRUPT

BACKGROUND

The present invention generally relates to processing systems, and more specifically, to identifying a delay associated with an input/output interrupt.

In processing systems operating with virtual machines, a hypervisor program divides physical resources, including a central processing unit (CPU), memory, storage, and I/O devices, of a processing system into separate virtual machines. For example, the hypervisor may allocate a predetermined time frame in which each virtual machine may access the CPU, and predetermined portions of memory or storage accessible by the respective virtual machines.

When an interrupt, referred to as an input/output (I/O) interrupt, occurs targeting a particular virtual machine, the hypervisor receives the interrupt and determines to which virtual machine the interrupt is directed. If another virtual machine is utilizing system resources, such as the CPU, a delay is caused in processing the interrupt by the target virtual machine until the hypervisor controls the CPU to begin running the target virtual machine. The target virtual machine may then perform one or more functions based on receiving the interrupt.

Other delays resulting from hypervisor managing of multiple virtual machines include emulation overhead in which instructions and operations to access I/O devices are intercepted by the hypervisor and scheduling delays due to packet transmission and reception involving multiple hypervisor threads and virtual machines.

SUMMARY

Embodiments of the present invention are directed to a computer-implemented method for identifying a delay associated with an input/output interrupt. A non-limiting example of the computer-implemented method includes detecting, by the processing device, input/output (I/O) interrupts for executing I/O operations occurring over a period of time. The method further includes calculating, by the processing device, an I/O interrupt delay time (IIDT) for each I/O interrupt occurring during the period of time. The method further includes binning, by the processing device, the IIDT for each I/O interrupt occurring during the period of time into one of a plurality of bins based on a value of the IIDT, each of the plurality of bins storing a count of IIDT values within a defined range. The method further includes determining, by the processing device, a highest IIDT value. The method further includes identifying, by the processing device, a performance degradation based at least on one of the count of IIDT values of each of the plurality of bins or the highest IIDT value. The method further includes implementing, by the processing device, a corrective action to mitigate the performance degradation.

Embodiments of the present invention are directed to a system. A non-limiting example of the system includes a memory comprising computer readable instructions and a processing device for executing the computer readable instructions for performing a method for identifying a delay associated with an input/output interrupt.

Embodiments of the invention are directed to a computer program product. A non-limiting example of the computer program product includes a computer readable storage medium having program instructions embodied therewith. The program instructions are executable by a processor to cause the processor to perform a method for identifying a delay associated with an input/output interrupt.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection".

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that, although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
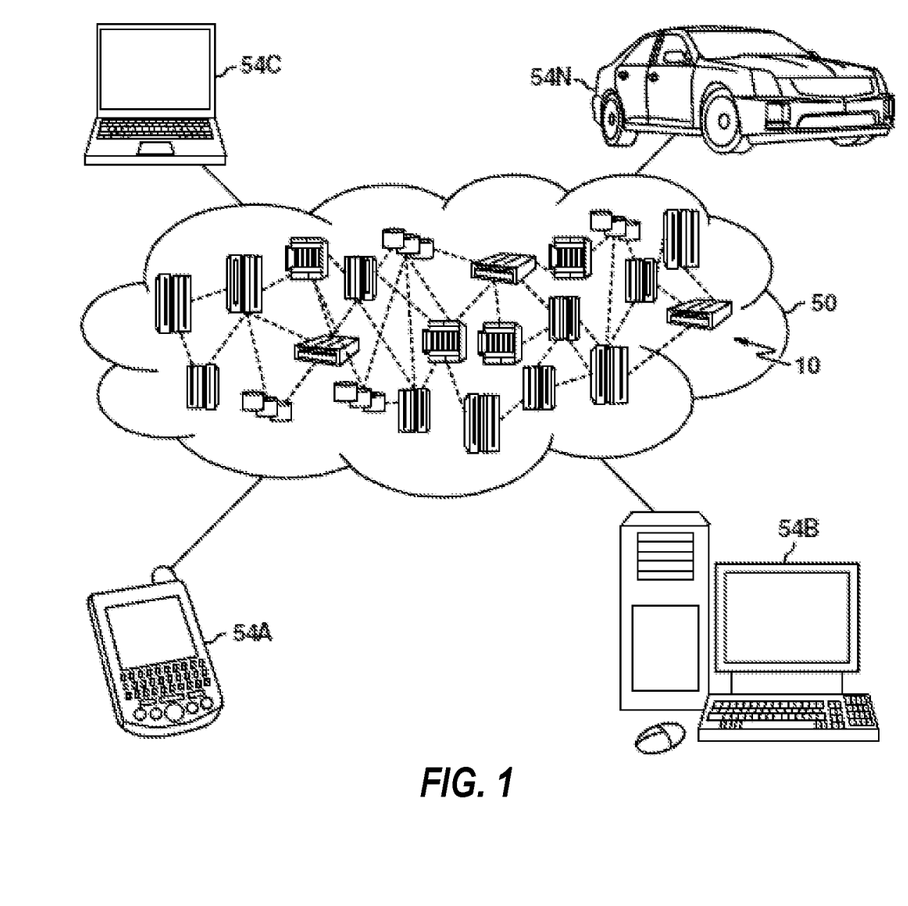
FIG. 1 depicts a cloud computing environment according to one or more embodiments described herein.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
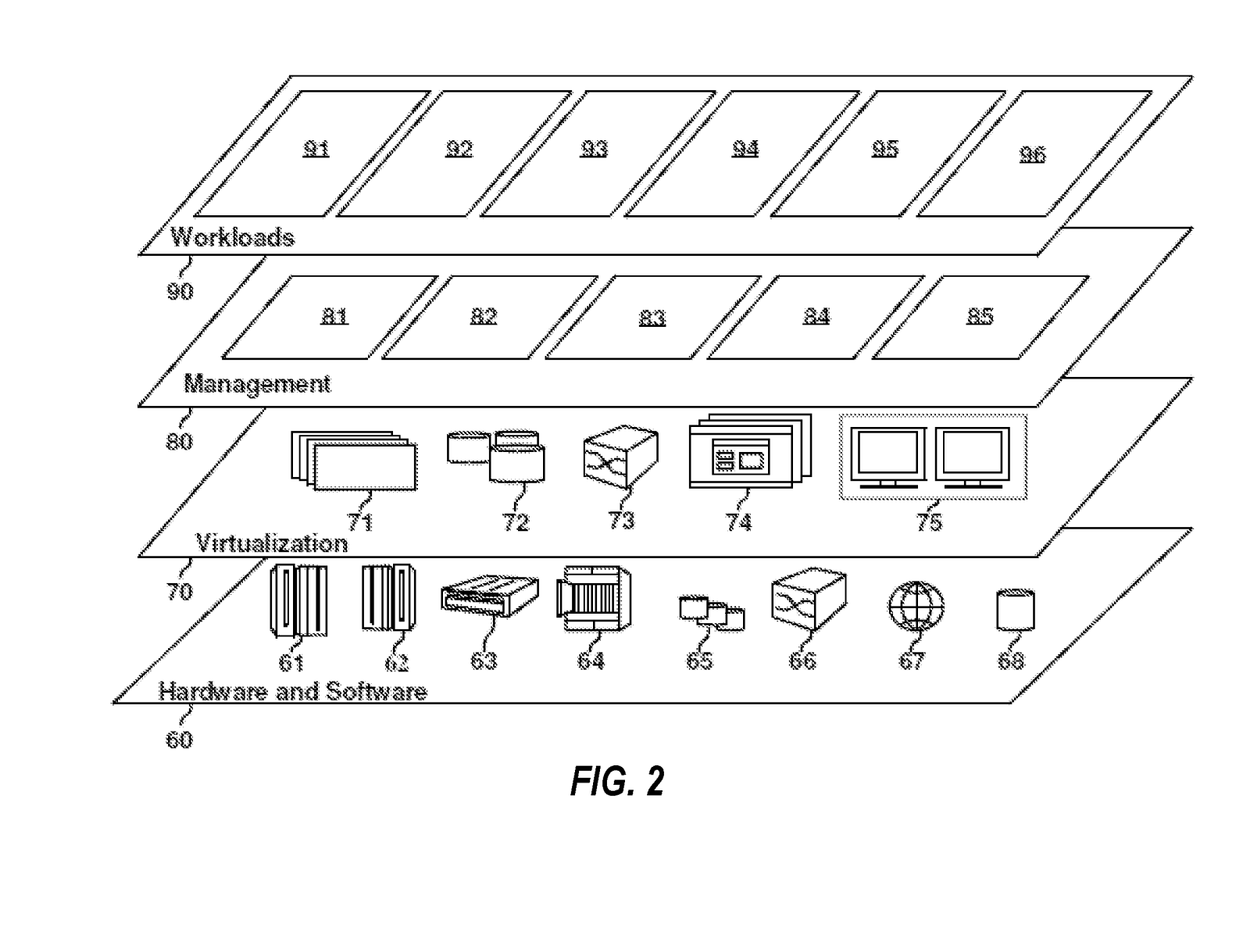
FIG. 2 depicts abstraction model layers according to one or more embodiments described herein.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and identifying a delay associated with an input/output interrupt 96.

Figure 3:
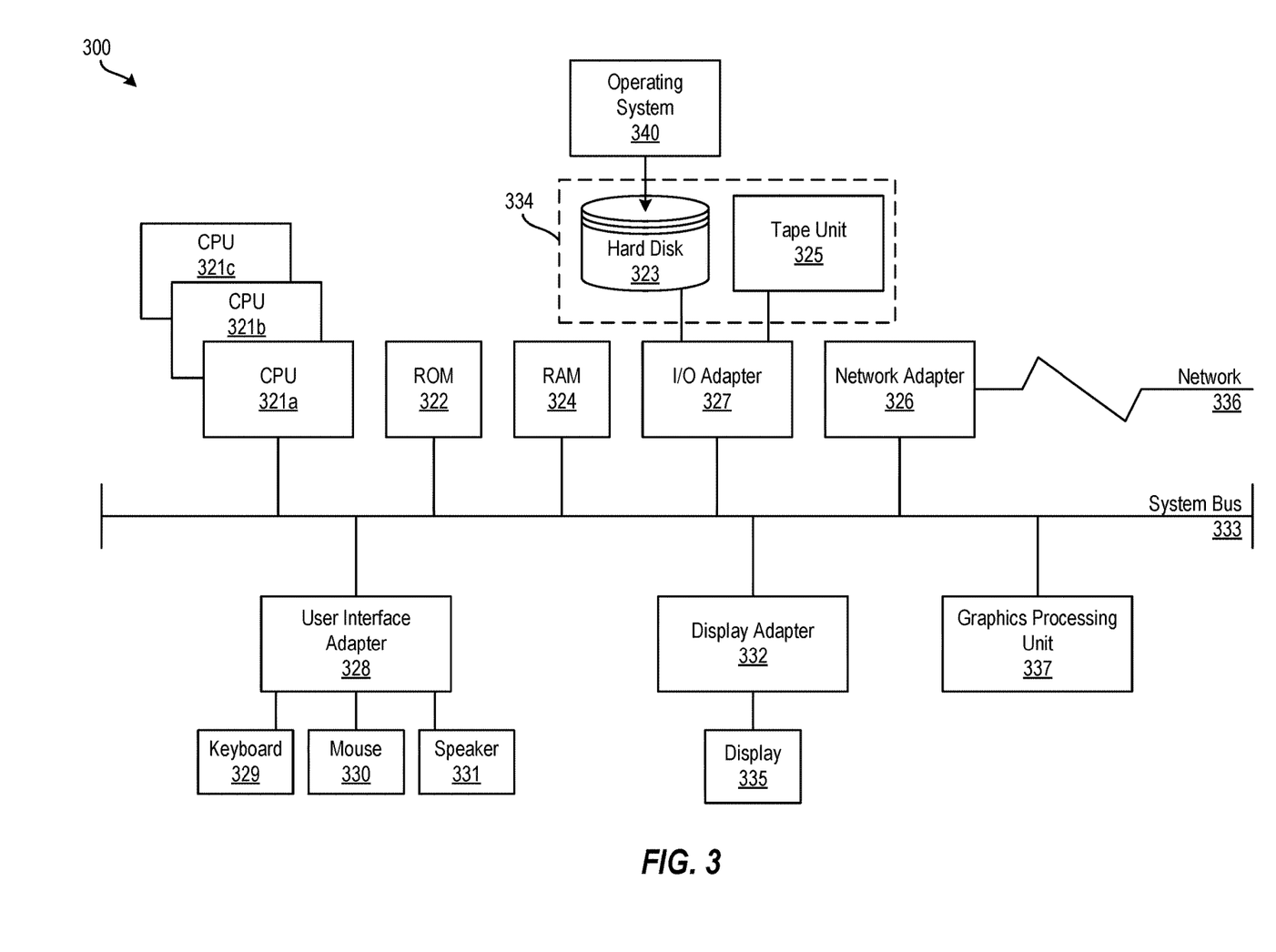
FIG. 3 depicts a block diagram of a processing system for implementing the presently described techniques according to one or more embodiments described herein.

It is understood that the present disclosure is capable of being implemented in conjunction with any other type of computing environment now known or later developed. For example, FIG. 3 depicts a block diagram of a processing system 300 for implementing the techniques described herein. In examples, processing system 300 has one or more central processing units (processors) 321$a$, 321$b$, 321$c$, etc. (collectively or generically referred to as processor(s) 321 and/or as processing device(s)). In aspects of the present disclosure, each processor 321 can include a reduced instruction set computer (RISC) microprocessor. Processors 321 are coupled to system memory (e.g., random access memory (RAM) 324) and various other components via a system bus 333. Read only memory (ROM) 322 is coupled to system bus 333 and may include a basic input/output system (BIOS), which controls certain basic functions of processing system 300.

Further depicted are an input/output (I/O) adapter 327 and a network adapter 326 coupled to system bus 333. I/O adapter 327 may be a small computer system interface (SCSI) adapter that communicates with a hard disk 323 and/or a tape storage drive 325 or any other similar component. I/O adapter 327, hard disk 323, and tape storage device 325 are collectively referred to herein as mass storage 334. Operating system 340 for execution on processing system 300 may be stored in mass storage 334. The network adapter 326 interconnects system bus 333 with an outside network 336 enabling processing system 300 to communicate with other such systems.

A display (e.g., a display monitor) 335 is connected to system bus 333 by display adapter 332, which may include a graphics adapter to improve the performance of graphics intensive applications and a video controller. In one aspect of the present disclosure, adapters 326, 327, and/or 332 may be connected to one or more I/O busses that are connected to system bus 333 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 333 via user interface adapter 328 and display adapter 332. A keyboard 329, mouse 330, and speaker 331 may be interconnected to system bus 333 via user interface adapter 328, which may include, for example, a Super I/O chip integrating multiple device adapters into a single integrated circuit.

In some aspects of the present disclosure, processing system 300 includes a graphics processing unit 337. Graphics processing unit 337 is a specialized electronic circuit designed to manipulate and alter memory to accelerate the creation of images in a frame buffer intended for output to a display. In general, graphics processing unit 337 is very efficient at manipulating computer graphics and image processing, and has a highly parallel structure that makes it more effective than general-purpose CPUs for algorithms where processing of large blocks of data is done in parallel.

Thus, as configured herein, processing system 300 includes processing capability in the form of processors 321, storage capability including system memory (e.g., RAM 324), and mass storage 334, input means such as keyboard 329 and mouse 330, and output capability including speaker 331 and display 335. In some aspects of the present disclosure, a portion of system memory (e.g., RAM 324) and mass storage 334 collectively store an operating system such as the AIX® operating system from IBM Corporation to coordinate the functions of the various components shown in processing system 300.

Figure 4:
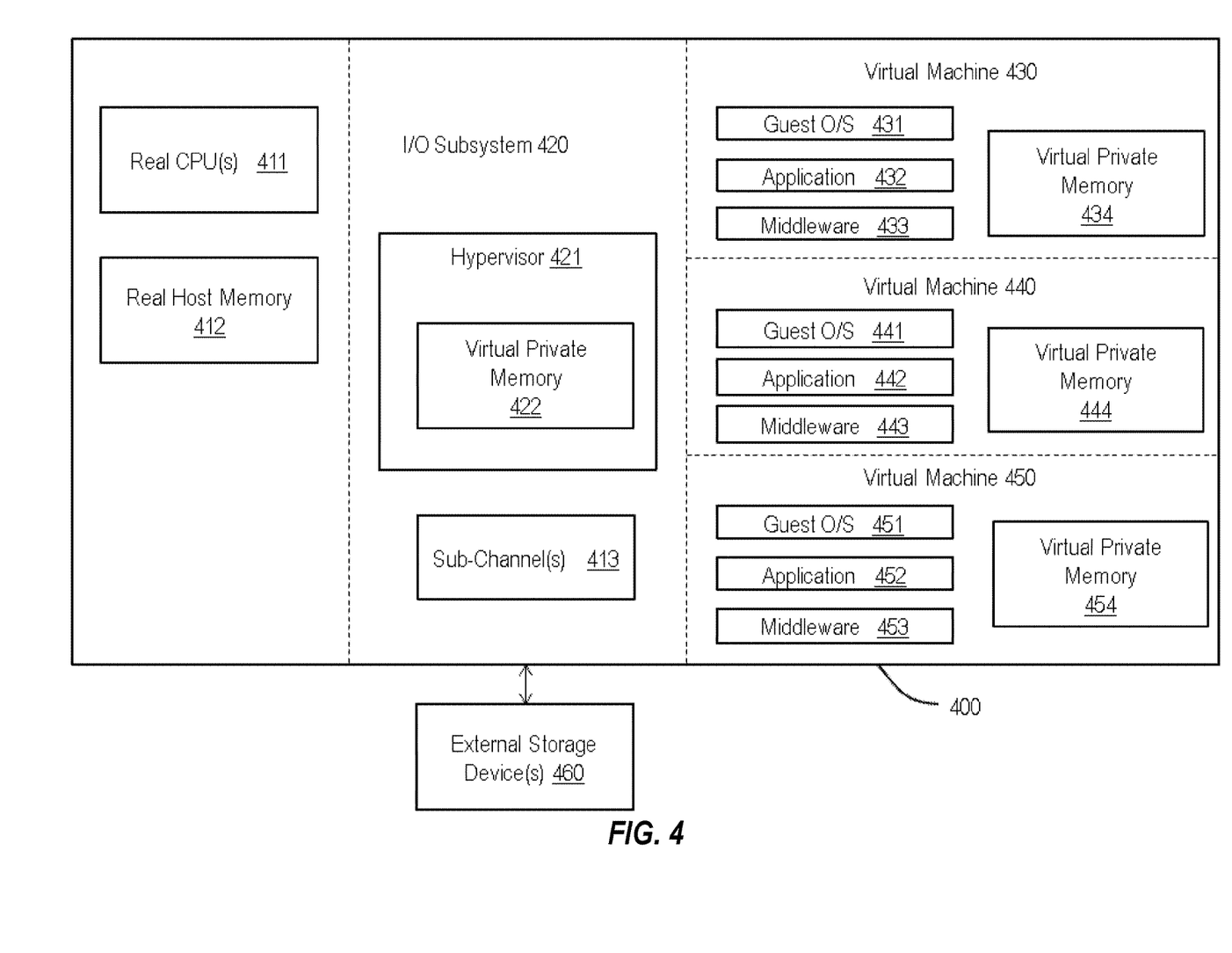
FIG. 4 depicts a block diagram of a virtual machine system according to one or more embodiments described herein.

Turning now to an overview of technologies that are more specifically relevant to aspects of the invention, FIG. 4 depicts a block diagram of a virtual machine system 400 according to one or more embodiments described herein. The system 400 includes one or more real CPUs 411 and real host memory 412. The one or more real CPUs 411 may each correspond to a separate processor or processing device, or each real CPU 411 may correspond to a plurality of processors, processing devices, processing units, or processing cores, depending upon the design requirements of the system 400. The system 400 further includes an I/O subsystem 420 and one or more virtual machines 430, 440, and 450. The virtual machines 430, 440, and 450 may also be referred to as logical partitions (LPARs) 430, 440, and 450. The system 400 is connected to one or more external storage devices 460.

Each virtual machine 430, 440, and 450 may include an instance or image of an operating system (O/S) 431, 441, and 451 (also referred to as a guest O/S 431, 441, and 451). Each virtual machine 430, 440, and 450 may further include one or more applications 432, 442, 452, middleware 433, 443, 453, and virtual private memory 434, 444, and 454. For purposes of description, the virtual machine 430 is described by way of example, although it is understood that the description of virtual machine 430 applies to each of the virtual machines 430, 440, and 450.

The guest O/S 431 may be an instance or an image of an O/S stored in the real host memory 412. Similarly, the application 432 and middleware 433 may be instances or images of applications and middleware stored in the real host memory 412. The virtual private memory 434 may be memory addresses within the real host memory 412 designated as corresponding to the virtual machine 430. In operation, each virtual machine 430, 440, and 450 operates separately from each other virtual machine 430, 440, and 450, running separate instances of operating systems, applications, and middleware, and storing data in separate memory, or portions of the real host memory 412 designated as corresponding to the respective virtual machines 430, 440, and 450.

The I/O subsystem 420 includes a hypervisor 421, or an LPAR dispatcher 421, to control operation of the virtual machines 430, 440, and 450. The hypervisor 421 may have virtual private memory 422 dedicated to the hypervisor 421. The hypervisor 421 may be a program stored in the real host memory 412 and executed by the one or more real CPUs 411, and the virtual private memory 422 may be a segment of the real host memory 412 dedicated to the hypervisor 421.

The hypervisor 421 manages the virtual machines 430, 440, and 450 by controlling which virtual machine 430, 440, and 450 may access the one or more real CPUs 411 at any given time, and by determining which transmitted and received signals, instructions, or other data corresponds to which virtual machine 430, 440, and 450. For example, if a signal is received from a sub-channel 413 for the virtual machine 430 while the virtual machine 450 is utilizing the one or more CPUs 411, the hypervisor 421 stores the signal until the virtual machine 430 is running and provides the signal to the virtual machine 430.

The I/O subsystem 420 further includes one or more sub-channels 413. The sub-channels 413 may correspond to data communication ports, supporting circuitry, and memory to communicate between the system 400 and external devices, such as the external storage device 460. Although one sub-channel 413 and one external storage device 460 is illustrated in FIG. 4, it is understood that embodiments of the present disclosure encompass any number of sub-channels 413 connected to any number of external storage devices 460. In particular, specific sub-channels 413 may correspond to specific external storage devices 460, such that an operating system access particular sub-channels 413 to access corresponding external storage devices 460.

In embodiments of the present disclosure, the hypervisor 421 tracks, in real-time, a time that it takes to manage the virtual machines 430, 440, and 450. Managing the virtual machines 430, 440, and 450 may include storing signals, commands, interrupts, or other data intended for a particular virtual machine until that particular virtual machine is running. Managing the virtual machines may also include determining whether to stop the operation of a virtual machine to provide access to another virtual machine. For example, when the three virtual machines 430, 440, and 450 all utilize the CPUs 411, the hypervisor 421 may control the virtual machines 430, 440, and 450 such that each virtual machine 430, 440, and 450 accesses the CPUs one-third of the time. However, the hypervisor 421 may determine whether to make an exception to the division of time among the virtual machines 430, 440, and 450 to allow one virtual machine to cut into the time of another, based on a type of command, signal, or data received or processed, a type of operation being run by a virtual machine, or any other consideration.

In operation, an application 432 or middleware 433 operating on the one or more real CPUs 411 may request access to a device, such as the external storage device 460. The access may include retrieving data in a load operation or sending data in a store operation. Although the external storage device 460 is provided as an example of a device that may be accessed by the system 400, it is understood that any device, such as a media device, display device, storage device, network device, or any other device, may be accessed by the system 400. The guest O/S 431 generates an access request signal based on the request from the application 432 or middleware 433. In one embodiment, the access request signal is a Start Sub-Channel (SSCH) instruction. A timestamp (SSCH_tod) indicates a time of day that the SSCH instruction occurred.

The guest O/S 431 transmits the SSCH instruction to the I/O subsystem 420. The I/O subsystem 420 may determine which sub-channel among a plurality of sub-channels corresponds to the device 460 that is the desired destination of the SSCH instruction. The I/O sub-system 420 transmits the SSCH instruction with the address of the desired device 460 to the sub-channel 413, which controls one or more switches or other devices to allow communication between the sub-channel 413 and the external storage device 460. In a load operation, data may be provided from a specified address of the external storage device 460 to the sub-channel 413. In a store operation, data may be provided from the sub-channel 413 to the external storage device 460.

Once the external storage device 460 is accessed, and data, if any, is stored in the real host memory 412, the sub-channel 413 generates an I/O interrupt and provides the I/O interrupt to the hypervisor 421 indicating that an operation has been completed. The hypervisor 421 may determine a guest O/S, or instance, among the virtual machines 430, 440, and 450 to which the I/O interrupt is intended. For example, the hypervisor 421 may determine that the I/O interrupt is to be provided to the guest O/S 431.

The hypervisor 421 may store the I/O interrupt in a cache or buffer. The cache or buffer may include a plurality of I/O interrupts corresponding to the different guest operating systems 431, 441 and 451, and the hypervisor 421 may dispatch the I/O interrupts asynchronously and out of order. The hypervisor 421 may determine whether to halt operation of a presently-running guest O/S to provide an I/O interrupt to another guest O/S, or to permit the presently-running guest O/S to complete running.

When the target guest O/S is running, or the guest O/S 431 in the present example, the hypervisor 421 may provide the I/O interrupt to the guest O/S 431. The guest O/S 431 may then perform an operation completion routine to determine the state of the sub-channel 413 and whether the device has been accessed. In embodiments of the present disclosure, the operation completion routine may be a Test Sub-Channel (TSCH) instruction. A timestamp (TSCH_tod) indicates a time of day that the TSCH instruction occurred. Upon determining that the device 460 has been successfully accessed, such as by a load or store operation, the guest O/S 431 may inform the application 432 or middleware 433 that data is available or has been stored.

The hypervisor 421 tracks a time between receipt of the I/O interrupt from the sub-channel 413 and a time that the guest O/S 431 generates the TSCH instruction to retrieve the status of the sub-channel 413. Accordingly, I/O subsystem 420 is able to track a delay in executing instructions from the virtual machines 430, 440, and 450 due to running the hypervisor 421 and running the multiple virtual machines 430, 440, and 450 instead of only one operating system. The tracked delay corresponds to the time required for the hypervisor 421 to manage an I/O interrupt directed to one of the guest operating systems 431, 441, or 451.

Traditionally, the hypervisor 421 determines the delay, referred to as an I/O interrupt delay time (IIDT), as an amount of time that it takes to complete an I/O request. The hypervisor 421 accumulates IIDT over a time interval and reports a lump sum IIDT for the time interval. For example, an IIDT may be reported as a lump sum of 154837 microseconds for an interval of 60 minutes. The drawback to this approach is that the lump sum reporting does not identify a spike in the IIDT. For example, if the delay is 154837 microseconds, the delay could be the result of many small delays (e.g., a few microseconds) or could be the result of one delay of 154837 microseconds. Accordingly, the lump sum approach creates a technical problem by not provide insight regarding spikes in the IIDT. To solve this technical problem, the present techniques offer a technical solution that uses a bucket or bin-based approach for identifying spikes in the IIDT. The technical solutions described herein identify IIDT spikes by binning IIDT for I/O interrupts into bins (also referred to as "buckets"). Each bin represents a count for a number of IIDT falling within a range for that respective bin. For example, an IIDT of 53 microseconds is be binned into a bin having an IIDT range of 10 microseconds to 100 microseconds.

To calculate the IIDT, an I/O response time is first calculated. The I/O response time is the amount of time it takes to complete an I/O request. To calculate the response time, a time of day clock (i.e., a timestamp) is used. More particularly, the response time is calculated as the SSCH_tod time subtracted from the TSCH_tod time. An amount of time the I/O spends in the device, referred to as a service time, is subtracted from the response time, and the results provide the IIDT for an I/O interrupt. The service time can include pending time, connect time, and disconnect time.

In some embodiments, once a delay due to virtualization has been calculated, the real CPUs 411 or I/O subsystem 420 may perform capacity planning to manage operations of the hypervisor 421, guest operating systems 431, 441, and 451, or the external storage devices 460. In this way, the IIDT, once determined, can be used to improve the functionality of the virtual machine system 400. In addition, the real CPUs or I/O subsystem 420 may provide hot spot analysis by identifying operations, operating systems 431, 441, or 451, applications 432, 442, or 452, or middleware 433, 443, or 453 that contributes most to a detected delay.

Figure 5:
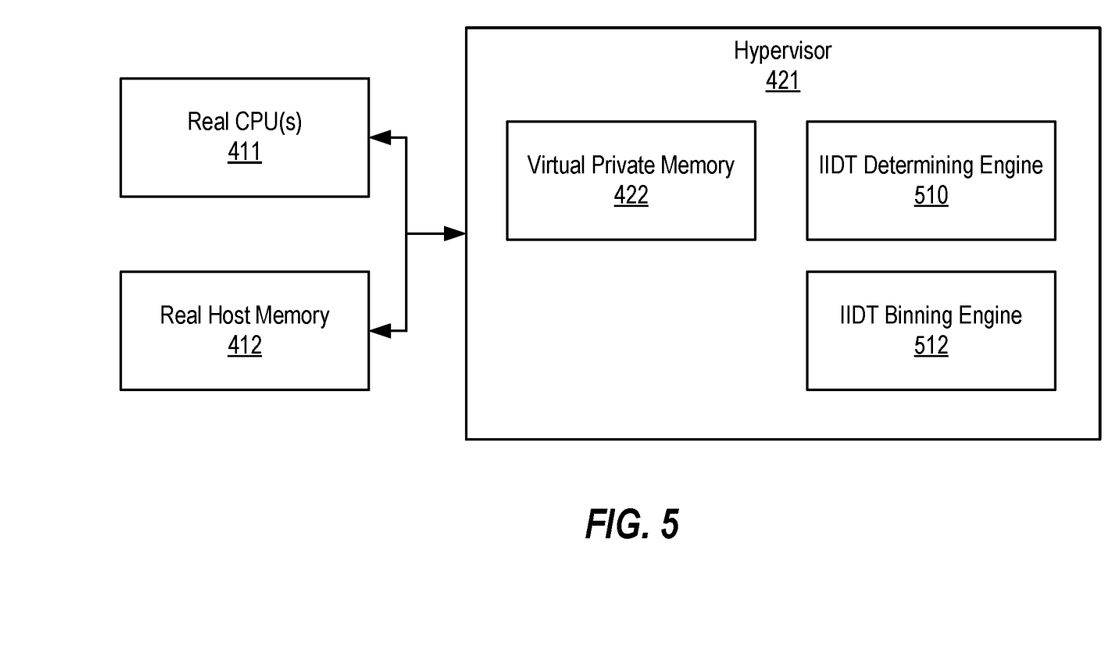
FIG. 5 depicts a block diagram of the hypervisor of FIG. 4 according to one or more embodiments described herein.

Turning now to a more detailed description of aspects of the present invention, FIG. 5 depicts a block diagram of the hypervisor 421 of FIG. 4 according to one or more embodiments described herein. As described regarding FIG. 4, the hypervisor 421 includes the virtual private memory 422 dedicated to the hypervisor 421. The hypervisor 421 may be a program stored in the real host memory 412 and executed by the one or more real CPUs 411, and the virtual private memory 422 may be a segment of the real host memory 412 dedicated to the hypervisor 421. According to the example of FIG. 5, the hypervisor 421 also includes an IIDT determination engine 510 to calculate the IIDT and an IIDT binning engine 512 to bin IIDT results.

The various components, modules, engines, etc. described regarding FIG. 5 can be implemented as instructions stored on a computer-readable storage medium, as hardware modules, as special-purpose hardware (e.g., application specific hardware, application specific integrated circuits (ASICs), application specific special processors (ASSPs), field programmable gate arrays (FPGAs), as embedded controllers, hardwired circuitry, etc.), or as some combination or combinations of these. According to aspects of the present disclosure, the engine(s) described herein can be a combination of hardware and programming. The programming can be processor executable instructions stored on a tangible memory, and the hardware can include the one or more real CPUs 411 for executing those instructions. Thus a system memory (e.g., the virtual private memory 422, the real host memory 412) can store program instructions that, when executed by the one or more real CPUs 411, implement the engines described herein. Other engines can also be utilized to include other features and functionality described in other examples herein. The features and functionality of the IIDT determination engine 510 and the IIDT binning engine 512 are now described in more detail with reference to FIGS. 6, 7, and 8.

Figure 6:
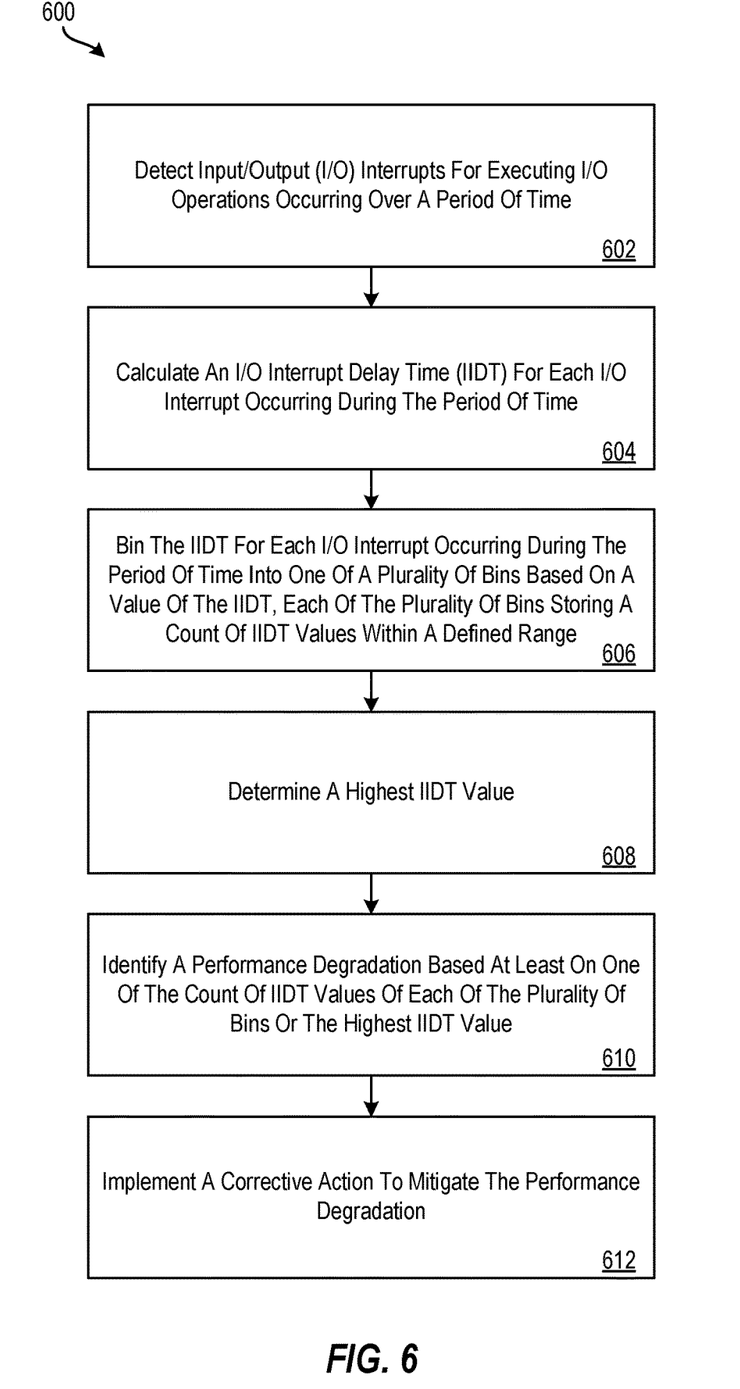
FIG. 6 depicts a flow diagram of a method for identifying a delay associated with an input/output interrupt according to examples of the present disclosure.

FIG. 6 depicts a flow diagram of a method 600 for identifying a delay associated with an input/output interrupt according to examples of the present disclosure.

At block 602, the hypervisor 421 detects input/output (I/O) interrupts for executing I/O operations occurring over a period of time. The hypervisor 421 can detect the I/O interrupts on a per-device basis. For example, the hypervisor 421 can detect I/O interrupts for a first device separately from I/O interrupts for a second device. The hypervisor 421 can detect the I/O interrupts over a period of time (e.g., 1 minute, 30 minutes, 4 hours, 1 day, etc.).

Figure 7:
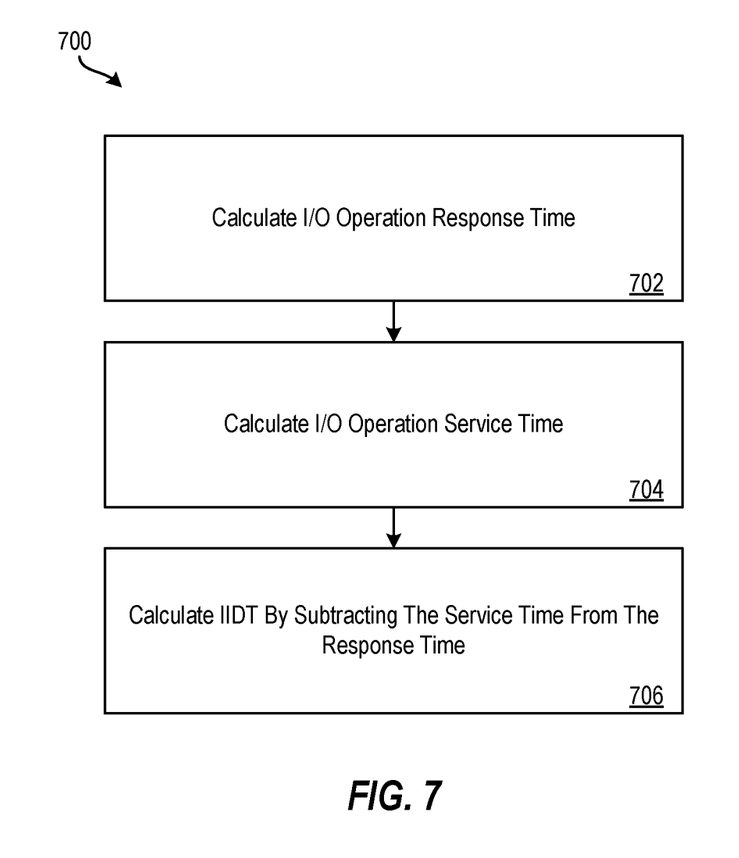
FIG. 7 depicts a flow diagram of a method for calculating an input/output interrupt delay according to examples of the present disclosure.

At block 604, the IIDT determination engine 510 calculates an I/O interrupt delay time (IIDT) for each I/O interrupt occurring during the period of time. FIG. 7 depicts a flow diagram of a method 700 for calculating the IIDT according to examples of the present disclosure. At block 702, the IIDT determination engine 510 calculates an I/O operation response time, which is the amount of time it takes to complete an I/O request. To calculate the response time, a time of day clock (i.e., a timestamp) is used. More particularly, the response time is calculated as the SSCH_tod time subtracted from the TSCH_tod time. At block 704, the IIDT determination engine 510 calculates an I/O operation service time, which is an amount of time the I/O spends in the device. At block 706, the IIDT determination engine 510 calculates the IIDT by subtracting the service time from the response time. In summary, the IIDT determination engine 510 calculates the IIDT based on the following formula:

$$IIDT=(TSCH\_tod-SSCH\_tod)-ServiceTime=ResponseTime-ServiceTime$$

Figure 8:
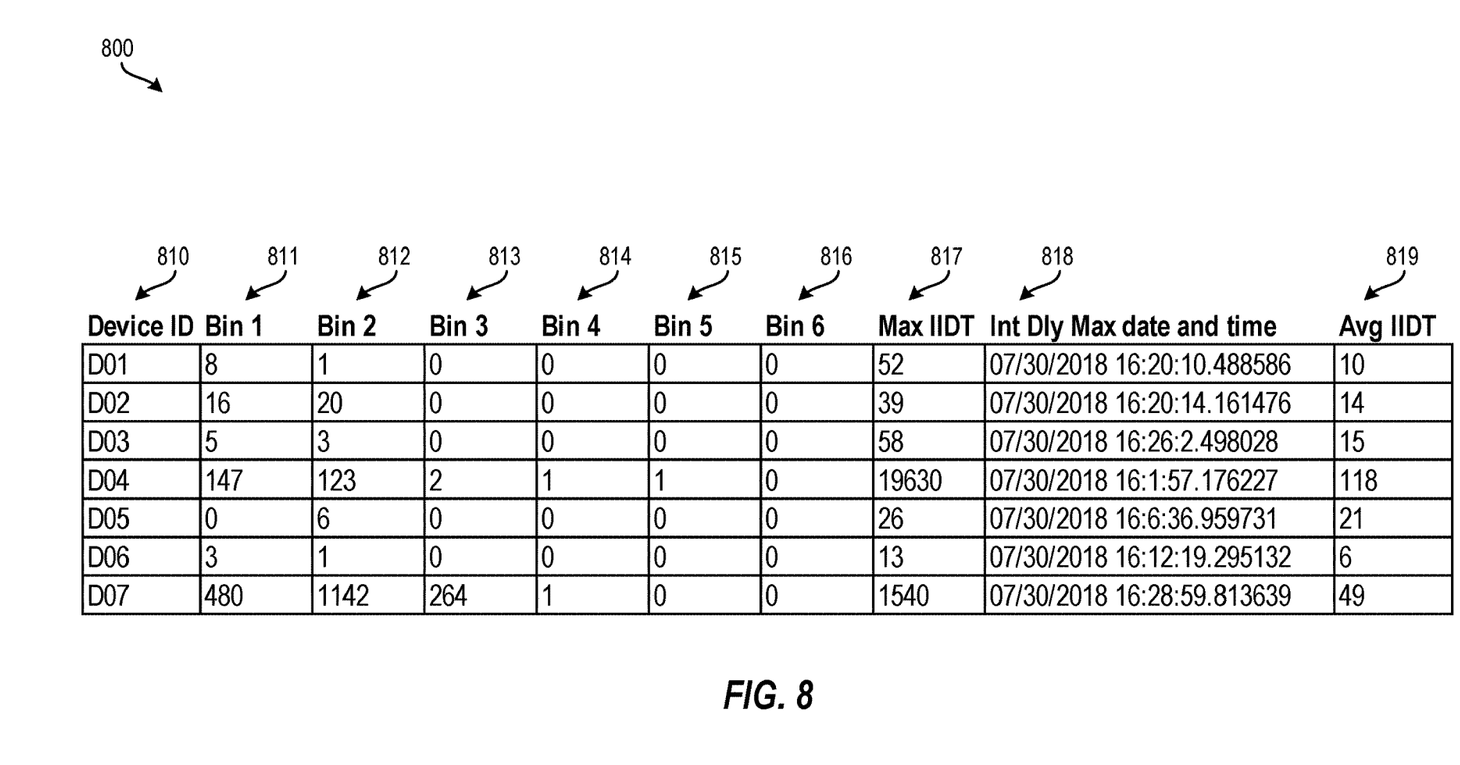
FIG. 8 depicts a table of binned IIDT results according to one or more embodiments described herein.

Returning to FIG. 6, at block 606, the IIDT binning engine 512 bins the IIDT for each I/O interrupt occurring during the period of time into one of a plurality of bins based on a value of the IIDT. Each of the plurality of bins stores a count of IIDT values within a defined range. For example, FIG. 8 depicts a table 800 of binned IIDT results according to one or more embodiments described herein. In this example, the results of the IIDT determination from block 604 of FIG. 6 are binned for 7 devices having device IDs D01-D07 shown in the table as Device IDs 810. The binning uses a plurality of bins. For example, a first bin 811 (or "bucket") stores a count for IIDT values between 0 and 9 microseconds. A second bin 812 stores a count for IIDT values between 10 and 99 microseconds. A third bin 813 stores a count for IIDT values between 100 and 999 microseconds. A fourth bin 814 stores a count for IIDT values between 1000 and 9999 microseconds. A fifth bin 815 stores a count for IIDT values between 10,000 and 99999 microseconds. A sixth bin 816 stores a count for IIDT values that are 100,000 microseconds or greater. For example, assume an IIDT is 23 microseconds. The IIDT binning engine 512 increments a count in the second bin 812 because the IIDT is between 10 and 99 microseconds. Each time an IIDT value is assigned to a bin, the count is incremented for that bin. This provides an improved understanding of how IIDT varies over time.

According to the example of FIG. 8, the table 800 shows that, for the device having a device ID D04, the first bin 811 indicates that 147 IIDTs occurred having an IIDT value between 0 and 9 microseconds, the second bin 812 indicates that 123 IIDTs occurred having an IIDT value between 10 and 99 microseconds, etc.

With continued reference to FIG. 6, at block 608, the IIDT determination engine 510 determines a highest IIDT value. The highest, or maximum, IIDT value is the highest value recorded during the period of time. Again, with reference to FIG. 8, the device having a device ID 801 of D04 has an associated maximum IIDT value 817 of 19630 microseconds. A time stamp 818 associated with the maximum IIDT value 817 is determined and recorded in table 800. The time stamp for the maximum IIDT value 817 for the device D04 occurred on Jul. 30, 2018 at 16:01:57.176227. According to one or more embodiments described herein, the IIDT determination engine 510 determines an average IIDT 819 occurring for each device over the period of time. In the case of the device D04, the average IIDT 819 is 118 microseconds.

At block 610, one or more of the guest O/S 431, 441, and 451, identifies a performance degradation based at least on one of the counts of IIDT values of each of the plurality of bins or the highest IIDT value. The hypervisor 421 can identify a performance degradation by comparing the binned values, maximum values, and/or average values to thresholds. For example, if the total number of binned IIDT values for a particular bin (e.g., the bin 3 of FIG. 8) exceeds a threshold (e.g., 20 binned values), the hypervisor 421 determines that performance degradation has occurred. In this example, based on table 800, the hypervisor 421 would determine that performance degradation has occurred for device D07.

In another example, if the average IIDT value exceeds a threshold (e.g., 100 microseconds), the hypervisor 421 determines that degradation has occurred. In this example, based on table 800, the hypervisor 421 would determine that performance degradation has occurred for device D04.

In yet another example, if the maximum IIDT value exceeds a threshold (e.g., 1000 microseconds), the hypervisor 421 determines that performance degradation has occurred. In this example, based on table 800, the hypervisor 421 would determine that performance degradation has occurred for devices D04 and D07.

At block 612, the hypervisor 421 implements a corrective action to mitigate the performance degradation. A corrective action can include scheduling certain I/O operations to occur during non-peak hours, utilizing different devices to perform certain I/O operations, performing maintenance on a device, and the like. By implementing a corrective action, IIDT can be reduced, thereby improving the functioning of the system 400.

Additional processes also may be included, and it should be understood that the process depicted in FIG. 6 represents an illustration, and that other processes may be added or existing processes may be removed, modified, or rearranged without departing from the scope and spirit of the present disclosure.

Example embodiments of the disclosure include or yield various technical features, technical effects, and/or improvements to technology. Example embodiments of the disclosure provide a PRF system configured to perform an unsupervised optimization process to determine an optimized relevance model by utilizing a posterior relevance model to estimate the likelihood that an initial set of top-K retrieved documents would be retrieved given the posterior relevance model, re-ranking the top-K documents based on their respective estimates of likelihood of retrieval, determining a rank similarity between the initial ranking of the top-K documents and the re-ranking of the top-K documents, updating one or more model parameters of the posterior relevance model based on the rank similarity, and iteratively performing the above process until the rank similarity is maximized, at which point, an optimized relevance model is obtained. These aspects of the disclosure constitute technical features that yield the technical effect of determining an optimized relevance model via a process that avoids query drift without requiring query anchoring, the technical effect of taking into account document relevance priors (and not assuming, as conventional PRF techniques do, that document relevance priors are uniform), and the technical effect of utilizing the feedback inherent in the initial ranking of the top-K documents by attempting to reconstruct a re-ranked listing of the top-K documents that matches the initial ranking. As a result of these technical features and technical effects, a PRF system in accordance with example embodiments of the disclosure represents an improvement to existing PRF techniques. It should be appreciated that the above examples of technical features, technical effects, and improvements to technology of example embodiments of the disclosure are merely illustrative and not exhaustive.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for identifying a delay associated with an input/output interrupt, the method comprising:
    detecting, by a processing device, input/output (I/O) interrupts for executing I/O operations occurring over a period of time;
    calculating, by the processing device, an I/O interrupt delay time (IIDT) for each I/O interrupt occurring during the period of time;
    binning, by the processing device, the IIDT for each I/O interrupt occurring during the period of time into one of a plurality of bins based on a value of the IIDT, each of the plurality of bins storing a count of IIDT values within a defined range;
    determining, by the processing device, a highest IIDT value;
    identifying, by the processing device, a performance degradation based at least on one of the count of IIDT values of each of the plurality of bins or the highest IIDT value; and
    implementing, by the processing device, a corrective action to mitigate the performance degradation.

2. The computer-implemented method of claim 1, further comprising calculating, by the processing device, a response time for each I/O interrupt occurring during the period of time and a service time for each I/O interrupt occurring during the period of time.

3. The computer-implemented method of claim 2, wherein the response time is calculated based at least in part on a time of day at a start of the I/O operation and a time of day at an end of the I/O operation.

4. The computer-implemented method of claim 2, wherein calculating the IIDT is based at least in part on the response time and the service time.

5. The computer-implemented method of claim 4, wherein the IIDT is calculated by subtracting the service time from the response time.

6. The computer-implemented method of claim 1, wherein the plurality of bins comprises a first bin and a second bin, wherein the defined range of IIDT values for the first bin is in logarithmic relationship to the defined range of IIDT values for the second bin.

7. The computer-implemented method of claim 1, wherein the performance degradation is identified when the highest IIDT value exceeds a maximum threshold.

8. The computer-implemented method of claim 1, wherein the performance degradation is identified when one of the plurality of bins contains a count of IDDT values exceeds a bin threshold.

9. The computer-implemented method of claim 1, where the I/O interrupts are detected for each of a plurality of devices.

10. The computer-implemented method of claim 1, further comprising determining, by the processing device, a time of day associated with the highest IIDT value.

11. A system comprising:
    a memory comprising computer readable instructions; and
    a processing device for executing the computer readable instructions for performing a method for identifying a delay associated with an input/output interrupt, the method comprising:
        detecting, by the processing device, input/output (I/O) interrupts for executing I/O operations occurring over a period of time;
        calculating, by the processing device, an I/O interrupt delay time (IIDT) for each I/O interrupt occurring during the period of time;
        binning, by the processing device, the IIDT for each I/O interrupt occurring during the period of time into one of a plurality of bins based on a value of the IIDT, each of the plurality of bins storing a count of IIDT values within a defined range;
        determining, by the processing device, a highest IIDT value;
        identifying, by the processing device, a performance degradation based at least on one of the count of IIDT values of each of the plurality of bins or the highest IIDT value; and
        implementing, by the processing device, a corrective action to mitigate the performance degradation.

12. The system of claim 11, further comprising calculating, by the processing device, a response time for each I/O interrupt occurring during the period of time and a service time for each I/O interrupt occurring during the period of time.

13. The system of claim 12, wherein the response time is calculated based at least in part on a time of day at a start of the I/O operation and a time of day at an end of the I/O operation.

14. The system of claim 12, wherein calculating the IIDT is based at least in part on the response time and the service time.

15. The system of claim 14, wherein the IIDT is calculated by subtracting the service time from the response time.

16. The system of claim 11, wherein the plurality of bins comprises a first bin and a second bin, wherein the defined range of IIDT values for the first bin is in logarithmic relationship to the defined range of IIDT values for the second bin.

17. The system of claim 11, wherein the performance degradation is identified when the highest IIDT value exceeds a maximum threshold.

18. The system of claim 11, wherein the performance degradation is identified when one of the plurality of bins contains a count of IDDT values exceeds a bin threshold.

19. The system of claim 11, where the I/O interrupts are detected for each of a plurality of devices.

20. A computer program product comprising:
    a computer readable storage medium having program instructions embodied therewith, the program instructions executable by a processing device to cause the processing device to perform a method for identifying a delay associated with an input/output interrupt, the method comprising:
        detecting, by the processing device, input/output (I/O) interrupts for executing I/O operations occurring over a period of time;
        calculating, by the processing device, an I/O interrupt delay time (IIDT) for each I/O interrupt occurring during the period of time;

binning, by the processing device, the IIDT for each I/O interrupt occurring during the period of time into one of a plurality of bins based on a value of the IIDT, each of the plurality of bins storing a count of IIDT values within a defined range;
determining, by the processing device, a highest IIDT value;
identifying, by the processing device, a performance degradation based at least on one of the count of IIDT values of each of the plurality of bins or the highest IIDT value; and
implementing, by the processing device, a corrective action to mitigate the performance degradation.

\* \* \* \* \*